(12) United States Patent
Pollman et al.

(10) Patent No.: US 10,567,151 B2
(45) Date of Patent: Feb. 18, 2020

(54) METHOD AND APPARATUS FOR OPERATING CO-LOCATED TRANSCEIVERS ON THE SAME FREQUENCY BAND

(71) Applicant: CommScope Technologies LLC, Hickory, NC (US)

(72) Inventors: Michael Pollman, Londonderry, NH (US); Jyotin Prakash Basrur, Shrewsbury, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/844,410

(22) Filed: Dec. 15, 2017

(65) Prior Publication Data

US 2018/0175998 A1    Jun. 21, 2018

Related U.S. Application Data (60) Provisional application No. 62/435,515, filed on Dec. 16, 2016.

(51) Int. Cl.
| | |
|---|---|
| *H04L 5/14* | (2006.01) |
| *H04B 1/38* | (2015.01) |
| *H04L 25/03* | (2006.01) |
| *H04W 84/04* | (2009.01) |

(52) U.S. Cl.
CPC ............. *H04L 5/1461* (2013.01); *H04B 1/38* (2013.01); *H04L 25/03* (2013.01); *H04W 84/045* (2013.01)

(58) Field of Classification Search
CPC ......... H04B 1/38; H04L 5/1461; H04L 25/03; H04W 72/082; H04W 72/1215; H04W 84/045

See application file for complete search history.

(56) References Cited

U.S. PATENT DOCUMENTS

| | | | |
|---|---|---|---|
| 6,609,010 B1 | 8/2003 | Dolle et al. | |
| 6,865,169 B1 * | 3/2005 | Quayle | ................ H04L 63/083 370/335 |
| 6,889,033 B2 * | 5/2005 | Bongfeldt | .......... H04B 7/15535 455/11.1 |

(Continued)

FOREIGN PATENT DOCUMENTS

| | | | | |
|---|---|---|---|---|
| CN | 102217214 A | * | 10/2011 | ............ H04B 7/155 |
| EP | 2359494 A2 | * | 8/2011 | ............ H04B 7/155 |

(Continued)

OTHER PUBLICATIONS

International Searching Authority, International Search Report and Written Opinion from PCT Application No. PCT/US2017/063455 dated Mar. 5, 2018, from Foreign Counterpart of U.S. Appl. No. 15/844,41; pp. 1-14; Published in WO.

*Primary Examiner* — Eric Nowlin
(74) *Attorney, Agent, or Firm* — Fogg & Powers LLC (57) ABSTRACT

A method for operating a small cell and a backhaul wireless modem. The method comprises: transmitting from the small cell on a first sub-band in one frequency band in which time division duplexing is used; receiving on the backhaul wireless modem, proximate to the small cell, on a second sub-band in the one frequency band and adjacent to the first sub-band; receiving on the small cell on the first sub-band; and transmitting from the backhaul wireless modem on the second sub-band.

24 Claims, 8 Drawing Sheets

(56) References Cited

U.S. PATENT DOCUMENTS

| | | | | |
|---|---|---|---|---|
| 7,289,494 B2* | 10/2007 | Lakkis | ............... | H04B 1/71632 370/314 |
| 8,023,886 B2* | 9/2011 | Rofougaran | ....... | H04B 7/15571 370/279 |
| 8,165,588 B2* | 4/2012 | Yu | ..................... | H04B 7/15542 370/315 |
| 8,228,878 B2* | 7/2012 | Larsson | ............... | H01Q 3/2605 370/335 |
| 8,457,549 B2* | 6/2013 | Weng | ................. | H04B 7/15585 455/15 |
| 8,570,933 B2* | 10/2013 | Lioliou | .............. | H04B 7/15564 370/252 |
| 8,594,008 B2* | 11/2013 | Wu | ......................... | H04B 7/155 370/315 |
| 8,718,542 B2* | 5/2014 | Braithwaite | ......... | H04B 7/2606 455/11.1 |
| 8,780,783 B2* | 7/2014 | Mildh | ..................... | H04B 7/155 370/315 |
| 8,849,186 B2* | 9/2014 | Gore | ....................... | H04B 1/525 455/7 |
| 8,934,398 B2* | 1/2015 | Gaal | ...................... | H04B 7/155 370/315 |
| 9,001,712 B2* | 4/2015 | Viswanathan | ......... | H04B 1/525 370/290 |
| 9,059,772 B2* | 6/2015 | Coldrey | ............. | H04B 7/15564 |
| 9,154,987 B2* | 10/2015 | Redana | ................. | H04W 24/10 |
| 9,185,711 B2* | 11/2015 | Lin | ..................... | H04B 7/15542 |
| 9,461,730 B2* | 10/2016 | Wilhelmsson | ......... | H04B 7/155 |
| 9,882,628 B2* | 1/2018 | Sundstrom | ............. | H04B 7/155 |
| 10,038,471 B2* | 7/2018 | Chang | ..................... | H04B 1/525 |
| 10,056,962 B2* | 8/2018 | Lin | ......................... | H04B 1/525 |
| 10,111,206 B2* | 10/2018 | Desai | ................... | H04W 36/165 |
| 2002/0045431 A1* | 4/2002 | Bongfeldt | ........... | H04B 7/15535 455/234.1 |
| 2005/0201326 A1* | 9/2005 | Lakkis | ............... | H04B 1/71632 370/329 |
| 2008/0043653 A1* | 2/2008 | Lakkis | ............... | H04B 1/71632 370/310 |
| 2008/0043654 A1* | 2/2008 | Lakkis | ............... | H04B 1/71632 370/310 |
| 2008/0049652 A1* | 2/2008 | Lakkis | ............... | H04B 1/71632 370/310 |
| 2008/0225758 A1* | 9/2008 | Proctor | .............. | H04B 7/15542 370/279 |
| 2009/0029645 A1* | 1/2009 | Leroudier | ............ | H04B 7/2606 455/7 |
| 2009/0088069 A1* | 4/2009 | Rofougaran | ......... | H04B 7/15535 455/7 |
| 2009/0130993 A1* | 5/2009 | Rofougaran | ........... | H04B 1/006 455/90.2 |
| 2009/0147706 A1* | 6/2009 | Yu | ...................... | H04B 7/15542 370/277 |
| 2009/0325626 A1 | 12/2009 | Palanki et al. | | |
| 2010/0124185 A1* | 5/2010 | Wu | ......................... | H04B 7/155 370/315 |
| 2010/0214964 A1* | 8/2010 | Larsson | ............... | H01Q 3/2605 370/277 |
| 2010/0291865 A1* | 11/2010 | Gore | ....................... | H04B 1/525 455/7 |
| 2011/0051628 A1* | 3/2011 | Cohen | ...................... | H04B 1/18 370/278 |
| 2011/0070824 A1* | 3/2011 | Braithwaite | ......... | H04B 7/2606 455/25 |
| 2011/0268014 A1* | 11/2011 | Mildh | .................... | H04B 7/155 370/315 |
| 2011/0292863 A1* | 12/2011 | Braz | ...................... | H04B 7/155 370/315 |
| 2012/0063369 A1* | 3/2012 | Lin | ..................... | H04B 7/15542 370/279 |
| 2012/0224472 A1* | 9/2012 | Kim | ...................... | H04W 24/04 370/226 |
| 2013/0034129 A1* | 2/2013 | Coldrey | ............. | H04B 7/15564 375/211 |
| 2013/0065638 A1 | 3/2013 | Cai et al. | | |
| 2013/0089021 A1* | 4/2013 | Gaal | ...................... | H04B 7/155 370/315 |
| 2013/0143483 A1* | 6/2013 | Gore | ................... | H04B 7/2606 455/7 |
| 2013/0225193 A1* | 8/2013 | Lee | ................... | H04W 72/1231 455/452.2 |
| 2013/0273834 A1* | 10/2013 | Sundstrom | ............. | H04B 7/155 455/7 |
| 2013/0279399 A1* | 10/2013 | Wilhelmsson | ......... | H04B 7/155 370/315 |
| 2013/0294295 A1* | 11/2013 | Viswanathan | ........ | H04L 5/1461 370/278 |
| 2013/0322322 A1* | 12/2013 | Redana | ................. | H04W 24/10 370/315 |
| 2014/0177484 A1* | 6/2014 | Balijapalli | ............. | H04B 1/001 370/280 |
| 2014/0185523 A1* | 7/2014 | Davydov | ............ | H04W 76/27 370/328 |
| 2016/0198475 A1* | 7/2016 | Uchiyama | ............. | H04W 52/38 370/329 |
| 2016/0365914 A1* | 12/2016 | Lin | ........................ | H04B 1/525 |
| 2016/0366614 A1* | 12/2016 | Hessler | ............... | H04W 28/0268 |
| 2017/0055304 A1* | 2/2017 | Pappa | ................... | H04W 24/02 |
| 2017/0325200 A1* | 11/2017 | Desai | ................... | H04W 36/165 |
| 2018/0131501 A1* | 5/2018 | Little | .................... | H04L 5/1461 |
| 2018/0175998 A1* | 6/2018 | Pollman | ................... | H04B 1/38 |
| 2018/0294867 A1* | 10/2018 | Schwab | ............. | H04B 7/15535 |
| 2018/0376459 A1* | 12/2018 | Desai | ................... | H04W 88/10 |

FOREIGN PATENT DOCUMENTS

| | | | | |
|---|---|---|---|---|
| EP | 2140579 A2 | 9/2016 | | |
| KR | 20110086754 A * | 7/2011 | ............. | H04B 7/155 |
| WO | WO-2010059516 A2 * | 5/2010 | ............. | H04B 7/155 |
| WO | 2010105210 A2 | 9/2010 | | |
| WO | WO-2010059516 A3 * | 9/2010 | ............. | H04B 7/155 |
| WO | WO-2012059555 A1 * | 5/2012 | ......... | H04B 7/15528 |
| WO | WO-2017196675 A2 * | 11/2017 | ......... | H04W 36/165 |
| WO | WO-2017196675 A3 * | 1/2018 | ......... | H04W 36/165 |
| WO | WO-2018111534 A1 * | 6/2018 | ............... | H04B 1/38 |

\* cited by examiner

METHOD AND APPARATUS FOR OPERATING CO-LOCATED TRANSCEIVERS ON THE SAME FREQUENCY BAND

CROSS-REFERENCE TO RELATED APPLICATIONS

This is a non-provisional application which claims the benefit of U.S. Provisional Patent Application Ser. No. 62/435,515, filed on Dec. 16, 2016, which is incorporated herein by reference in its entirety.

BACKGROUND

A Long Term Evolution (LTE) wireless network includes an Evolved Universal Terrestrial Radio Access Network (E-UTRAN) (also sometimes referred to simply as the "radio access network" or "RAN") and an Evolved Packet Core (EPC) network (also sometime referred to simply as the "core network").

The E-UTRAN comprises a set of base stations that wirelessly communicate with user equipment (such as smartphones) using licensed radio frequency spectrum. Each base station is also generally referred to as an "eNodeB" or "eNB."

One type of eNodeB is a "macro" eNodeB (or eNodeB macro cell), which is a higher-power base station that is typically used to provide base station capacity in a relatively large area that includes both outdoor areas and indoor areas. In general, each location within a service provider's network is notionally within the coverage area of at least one macro eNodeB. However, in practice, there are some locations (for example, within homes and office buildings) for which good coverage cannot be provided by any macro eNodeB in an operator's network. Also, there may be some locations (for example, within public venues such as office buildings, stadiums, airports, etc.) where a large number of users congregate during certain periods. During those periods, the associated macro eNodeBs may not be able provide sufficient base-station capacity to the congregated users, even if it is possible to provide sufficient wireless coverage.

One type of eNodeB is a "small cell" or "femtocell," which is a lower-power base station. A small cell can be used to provide improved wireless coverage and/or capacity in order to address the issues noted in the previous paragraph. This is done by deploying the small cell directly with the location that has a coverage and/or capacity issue.

Each eNodeB communicates with entities in the core network (such as, a Serving Gateway (S-GW) and a Mobility Management Entity (MME)) using the "Si interface" defined by the 3rd Generation Partnership Project (3GPP). Each eNB also communicates with other eNBs using the "X2 interface" defined by the 3GPP. These protocols are Internet Protocol (IP) based and often use public networks such as the Internet. The communication link that couples an eNodeB to the core network is referred as the "back haul" link.

Such a back haul link can be implemented using a wired connection. The back haul link can also be implemented using a wireless connection. Indeed, in some small cell deployments, the wireless back haul for a small cell eNodeB is provided using a wireless communication link that is implemented with a macro eNodeB. That is, for such a small cell eNodeB, a wireless modem, or backhaul wireless modem, is provided with the small cell that functions as user equipment from the perspective of the macro eNodeB and that functions as the termination point of an IP connection from the perspective of the small cell eNodeB.

In some cases where this type of wireless backhaul is used with a small cell, the small cell and corresponding backhaul wireless modem are proximate and may operate in the same band using time division duplexing (TDD). However, transmissions by the transmitter of one transceiver in either the small cell or the backhaul wireless backhaul modem may desensitize the receiver of the other transceiver in either the backhaul wireless modem or the small cell, respectively, due to saturation of the receiver caused by the relatively high incident power from the nearby transmitter, and an increased noise floor due to noise, e.g. sideband noise, broadcast by the transmitter.

SUMMARY OF THE INVENTION

A method for operating a small cell and a backhaul wireless modem. The method comprises: transmitting from the small cell on a first sub-band in one frequency band in which time division duplexing is used; receiving on the backhaul wireless modem, proximate to the small cell, on a second sub-band in the one frequency band and adjacent to the first sub-band; receiving on the small cell on the first sub-band; and transmitting from the backhaul wireless modem on the second sub-band.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Embodiments described below provide a technique to enable a small cell and a backhaul wireless modem to operate when proximate. Advantageously, embodiments enable the small cell and the backhaul wireless modem to be co-located by using inexpensive components such as commercial off the shelf parts.

Figure 1:
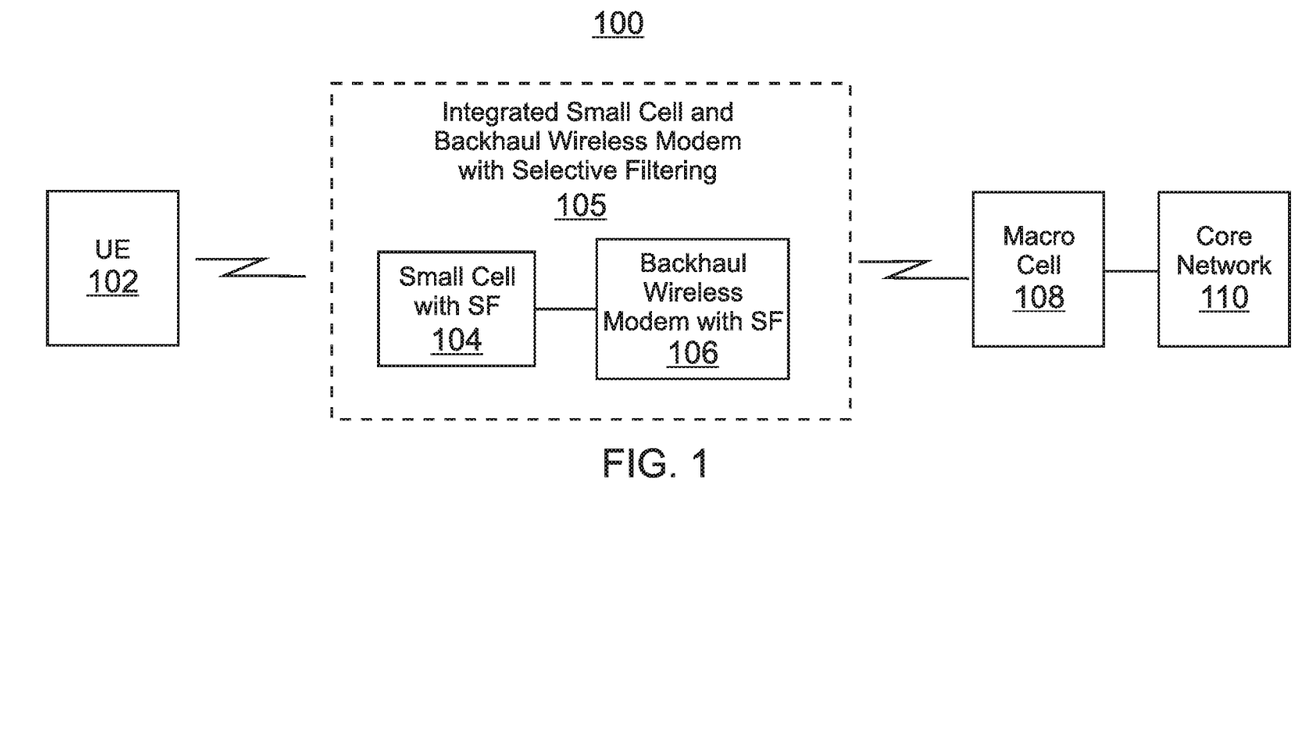
FIG. 1 illustrates a block diagram of an exemplary communications network with selective filtering.

FIG. 1 illustrates a block diagram of an exemplary communications network with selective filtering 100. The communications network with selective filtering 100 includes one or more user equipment (UE) 102, a small cell with selective filtering 104, a backhaul wireless modem with selective filtering 106, and a macro cell 108. In one embodiment, the small cell with selective filtering 104 and the backhaul wireless modem with selective filtering 106 may be packaged together, forming an integrated small cell and backhaul wireless modem with selective filtering 105.

Both the small cell with selective filtering 104 and the macro cell 108 are base station entities (for example, eNodeBs in the case of a LTE network) and are coupled to the operator's core network 110. The macro cell 108 can be coupled to the core network 110 using any suitable wired or wireless backhaul communication link. The small cell with selective filtering 104 is coupled to the core network 110 using a wireless back haul link implemented with the macro cell 108. The backhaul wireless modem with selective filtering 106 is provided with the small cell with selective filtering 104, and functions as user equipment from the perspective of the macro cell 108 and functions as the termination point of an IP connection from the perspective of the small cell with selective filtering 104.

The small cell with selective filtering 104 and the backhaul wireless modem with selective filtering 106 may operate, or be used, on the same band (for example LTE band 41) using time division duplexing. When the small cell with selective filtering 104 and backhaul wireless modem with selective filtering 106 are proximate and operate simultaneously using TDD in the same band, the receiver of each may become de-sensitized. To remedy this problem and permit proximate, simultaneous operation, selective filtering is used. Selective filtering involves operating the transceivers of each of the small cell with selective filtering 104 and the backhaul wireless modem with selective filtering 106 on different, but adjacent sub-bands in the same operating band, and providing sufficient filtering in each transceiver to substantially reduce or even eliminate receiver desensitization. Adjacent means, with respect to the proximity of sub-bands, that the sub-bands are separated by a guard band whose bandwidth is equal to, greater than, or less than the guard band specified for frequency division duplexing using the same air interface.

Figure 2:
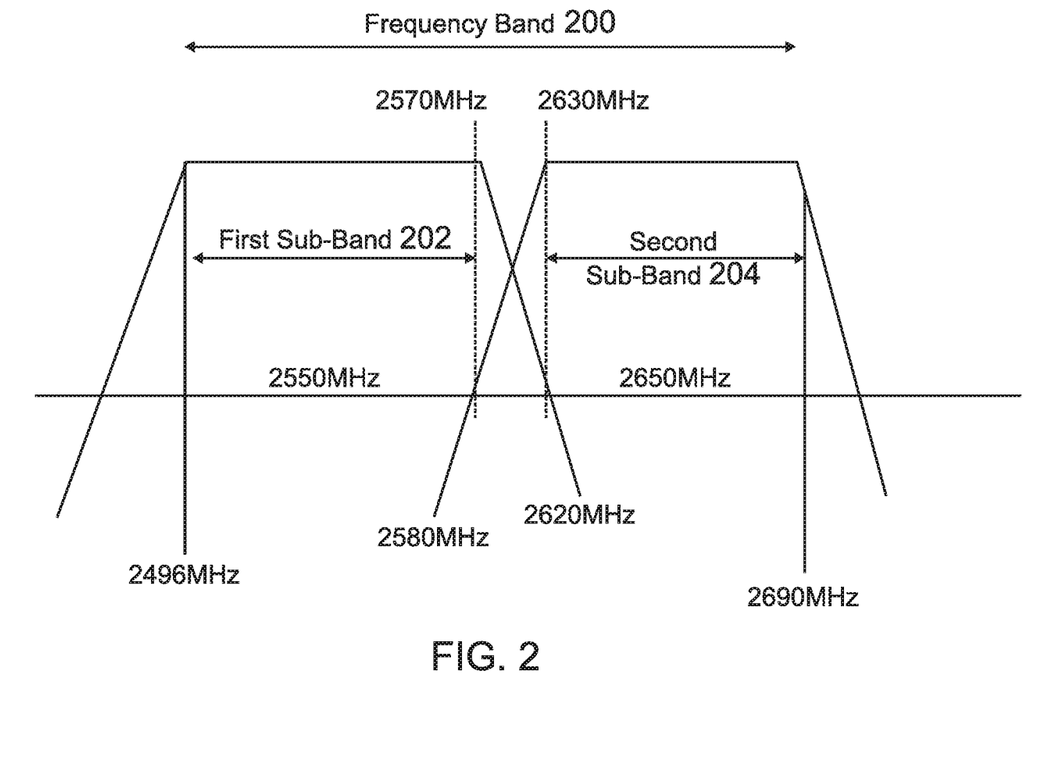
FIG. 2 illustrates an exemplary frequency band with a first sub-band and an adjacent second sub-band.

Time division multiplexing is implemented as follows. In one embodiment, the one or more user equipment (UE) 102 and the small cell with selective filtering 104 transmit and receive wirelessly on a first sub-band of a frequency band when the backhaul wireless modem with selective filtering 106 and a macro cell 108 respectively receive and transmit on the second sub-band of the frequency band. FIG. 2 illustrates an exemplary frequency band 200 with a first sub-band 202 and an adjacent second sub-band 204. In one embodiment, the frequency band 200 is LTE band 41 which ranges from 2496 MHz to 2690 MHz. In another embodiment, the first sub-band 202 is from 2496 MHz to 2570 MHz. In a further embodiment, the second sub-band 204 is from 2630 to 2496 MHz. In yet another embodiment, the first sub-band 202 and the second sub-band are separated by a 60 MHz guard band. In yet a further embodiment, the first sub-band 202 and the second sub-band 204 are respectively the uplink sub-band and the downlink sub-band for a frequency division duplexing band for another air interface, e.g. 3G UMTS. In another embodiment, the first sub-band 202 is approximately uplink sub-band for 3G UMTS band 7, and the second sub-band 204 is approximately downlink sub-band for 3G UMTS band 7. The uplink sub-band for 3G UMTS band 7 is 2500 MHz to 2570 MHz. The downlink sub-band for 3G UMTS band 7 is 2620 MHz to 2690 MHz.

The first sub-band 202 and the second sub-band 204 are used respectively by the small cell with selective filtering 104 and the backhaul wireless modem with selective filtering 106, or vice versa. The small cell with selective filtering 104 and the backhaul wireless modem with selective filtering 106 operate in TDD each transmitting when the other is receiving. To avoid desensitizing the receiver in each, selective filtering is used in each of the small cell and the backhaul wireless modem as will now be described. The selective filtering in a transceiver, operating in a sub-band, provides enhanced filtering and suppression of undesired signals in the adjacent sub-band used by the other transceiver.

Figure 3:
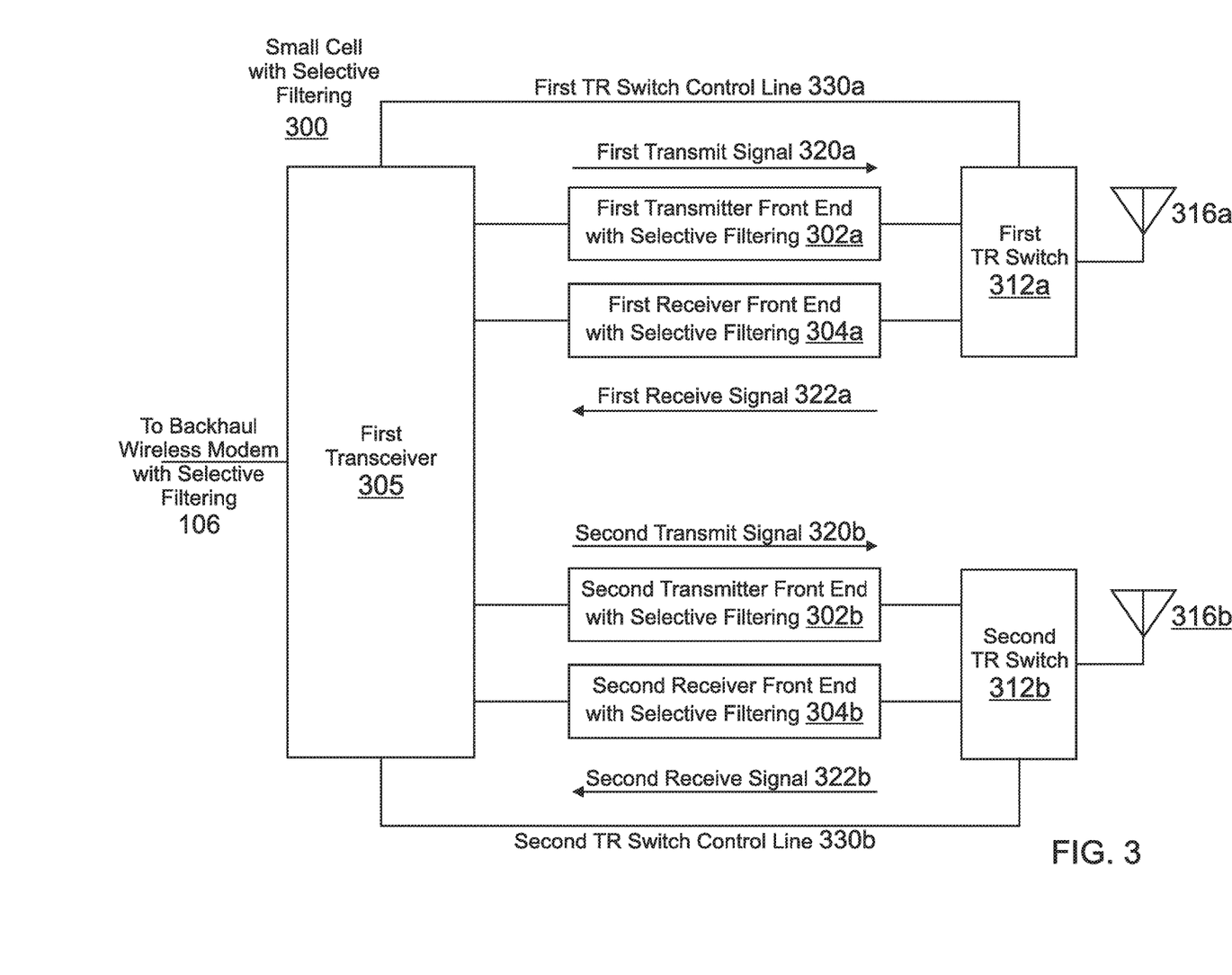
FIG. 3 illustrates an exemplary small cell with selective filtering.

FIG. 3 illustrates an exemplary small cell with selective filtering 300. The small cell with selective filtering 300 employs multiple-input multiple-output (MIMO) technology having two transmission channels and two reception channels. However, in alternative embodiments, the small cell with selective filtering 300 may have more than two transmission channels and may have more than two reception channels.

One transmission channel and one reception channel are coupled to a common antenna, through a transmit-receive switch, and to the first transceiver 305. The first transceiver 305 is also coupled to the transmit receive-switch, and is configured to select whether the antenna is connected to either the receive channel or the transmit channel depending upon whether the first transceiver 305 is transmitting or receiving. The first transceiver is also coupled to the backhaul wireless modem with selective filtering 106.

The transmit-receive switches enable time domain duplexing operation by the small cell with selective filtering 300, and the subsequently described backhaul wireless modem with selective filtering 106. The transmit-receive switches must have sufficient insertion loss, isolation, and power compression to attain the design parameters for the transceiver in which the transmit-receive switches are used. The illustrated transmit-receive switches are single pole double throw (SPDT) switches. However, N pole double throw (NPDT) switches, where N>2, can be used to couple two or more pairs of reception and transmission channels to corresponding antennas.

In one embodiment, each transmit channel is comprised of a transmitter front end with selective filtering, and an upconverter and a baseband processor of the first transceiver 305. In another embodiment, each receive channel is comprised of a receiver front end with selective filtering, and a downconverter and the baseband processor of the first transceiver 305.

The exemplary small cell with selective filtering 300 comprises a first transmitter front end 302a and a second transmitter front end 302a, and a first receiver front end 304a and a second receiver front end 304a. The first transmitter front end 302a and the first receiver front end 304a are alternately coupled to a first antenna 316a. The second transmitter front end 302b and the second receiver front end 304b are alternately coupled to a second antenna 316b. The first transmitter front end 302a, the second transmitter front end 302b, the first receiver front end 304a, and the second receiver front end 304b are coupled to a first transceiver 305. In one embodiment, the first transceiver 305 includes at least one baseband processor, at least one upconverter, and at least one downconverter. In another embodiment, e.g. for a first transceiver 305 implementing two MIMO transmit and two MIMO receive channels, the first transceiver 305 includes at least one baseband processor, two upconverters, and two downconverters. In another embodiment, the first transceiver 305 includes at least one baseband processor, two upconverters, and two downconverters.

The output of the first transmitter front end 302a and the input of the first receiver front end 304a are respectively coupled to the first terminal and the second terminal of a first transmit-receive (TR) switch 312a. The output of the second transmitter front end 302b and the input of the second receiver front end 304b are respectively coupled to the first terminal and the second terminal of a second transmit-receive switch 312b. In one embodiment, the first transmit-receive switch 312a and the second transmit-receive switch 312b are single pole double throw (SPDT) switches. The common terminals of the first transmit-receive switch 312a and second transmit-receive switch 312b are respectively coupled to a first antenna 316a and a second antenna 316b. The first transmit-receive switch 312a and the second transmit-receive switch 312b are respectively coupled to the first transceiver 305 by the first TR switch control line 330a and the second TR switch control line 330b. Control signals, from the first transceiver 305 are communicated over the first TR switch control line 330a and the second TR switch control line 330b, and respectively control the position of the first transmit-receive switch 312a and the second transmit-receive switch 312b to permit the small cell with selective filtering 300 to switch between transmitting and receiving to properly operate in time division duplexing mode.

A first transmit signal 320a flows in the first transmitter front end 302a from the first transceiver 305 towards the first antenna 316a. A second transmit signal 320b flows respectively in the second transmitter front end 302b from the first transceiver 305 towards the second antenna 316b. A first receive signal 322a flows in the first receiver front end 304a to the first transceiver 305 away from the first antenna 316a. A second receive signal 322b flows respectively in the second receiver front end 304b to the first transceiver 305 away from the second antenna 316b.

Figures 4A, 4B:
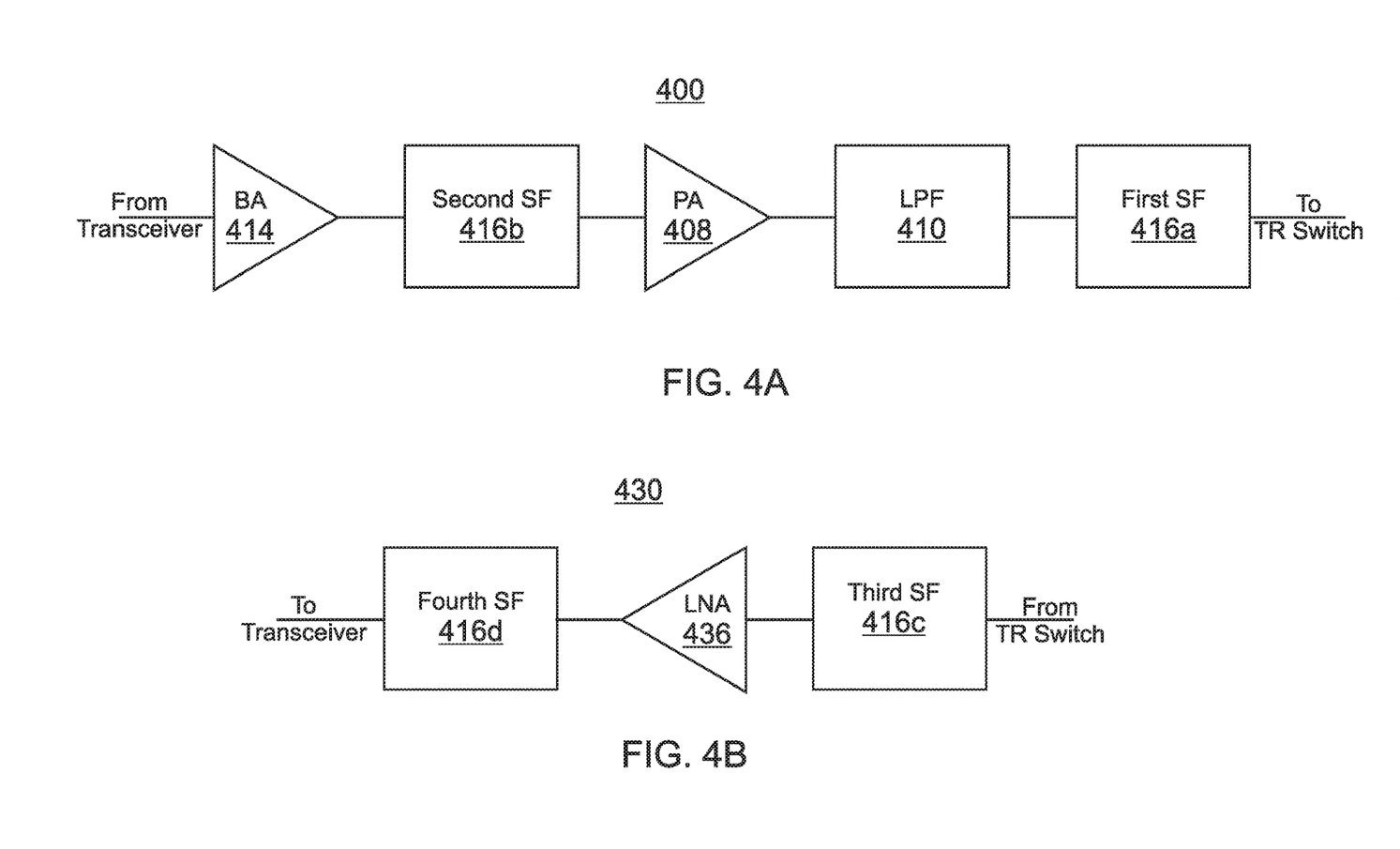
FIG. 4A illustrates one embodiment of a transmitter front end.
FIG. 4B illustrates one embodiment of a receiver front end.

FIG. 4A illustrates one embodiment of a transmitter front end 400. In another embodiment, each transmitter front end includes a power amplifier 408, a low pass filter (LPF) 410, and a first selective filter (SF) 416a. An input of the power amplifier 408 is coupled to an output of a transceiver, e.g. an output of an exciter in the transceiver. An output of the power amplifier 408 is coupled to an input of the low pass filter 410. An output of the low pass filter 410 is coupled to an input of the first selective filter 416a. The output of the first selective filter 416a is coupled to a transmission-receive switch.

In one embodiment, a buffer amplifier (BA) 414 is inserted between the transceiver and the power amplifier 408. The input of the buffer amplifier 414 is coupled to an output of the transceiver. The output of the buffer amplifier 414 is coupled to an input of the power amplifier 408.

In one embodiment, a second selective filter 416b is inserted between the transceiver and the power amplifier 408 to provide additional filtering and suppression of out of sub-band signals broadcast from the transceiver. The input of the second selective filter 416b is coupled to the output of either the buffer amplifier 414, if used, or alternatively to the output of the transceiver. The output of the second selective filter 416b is coupled to the input of the power amplifier 408. The second selective filter 416b can be employed to further suppress out-of-band noise, e.g. sideband noise, generated by the transmitter of a transceiver. The second selective filter 416b may be required if the transmitter front end has high gain which would amplify such noise. In one embodiment, the one or more selective filters in the transmitter front end attenuate signals, broadcast by the transmitter of the transceiver and in the sub-band of the other transceiver, by at least fifty-five decibels.

FIG. 4B illustrates one embodiment of a receiver front end 430. In another embodiment, each receiver front end includes a third selective filter 416c and a low noise amplifier 436. An output of the third selective filter 416c is coupled to an input of a low noise amplifier 436. An input of the third selective filter 416c is coupled to a transmit-receive switch. An output of the low noise amplifier 436 is coupled to an input of the transceiver, e.g. the input of a downconverter. In the embodiment illustrated in FIG. 4B, a fourth selective filter 416d is coupled between the input of a transceiver and the output of the low noise amplifier 436 to provide enhanced filtering and suppression of out-of-band signals, e.g. from the adjacent transmitter. In one embodiment, the selective filter(s) in the receiver front end attenuates signals, broadcast by and in the sub-band of the other transceiver, by at least fifty-five decibels.

Figure 5:
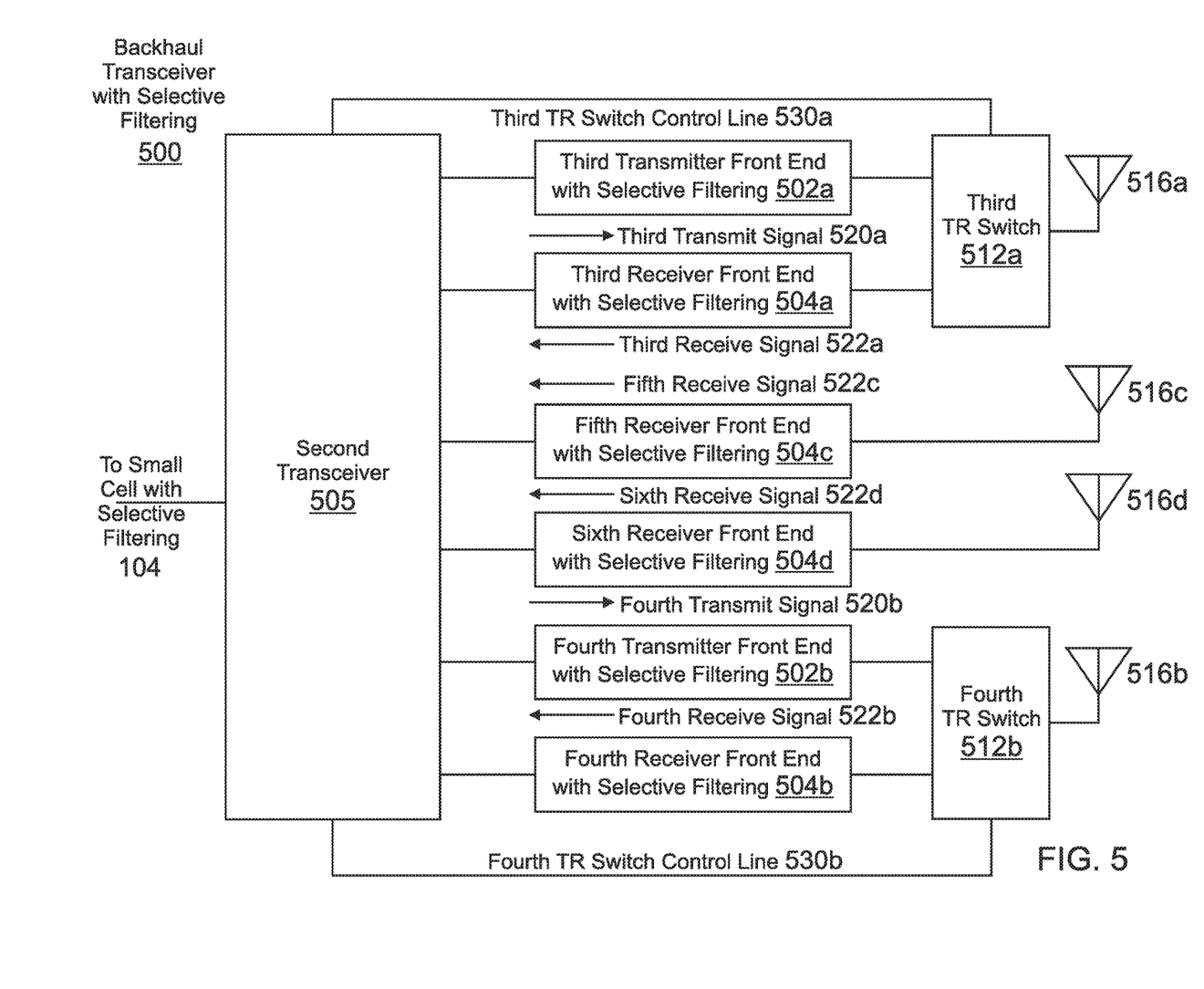
FIG. 5 illustrates an exemplary embodiment of a backhaul wireless modem with selective filtering.

FIG. 5 illustrates an exemplary embodiment of a backhaul wireless modem with selective filtering 500. The exemplary backhaul wireless modem with selective filtering 500 employs multiple-input multiple-output (MIMO) technology having two transmission channels and four reception channels. However, in another embodiment, the backhaul wireless modem with selective filtering 500 may have more than two transmission channels, and may have two or more than four reception channels. In a further embodiment, a multi-element, e.g. eight elements, smart antenna having beam steering is used in lieu of the individual antennas in the backhaul wireless modem with selective filtering 500. Such beam steering increases equivalent isotropic receiver sensitivity and radiated power of the backhaul wireless modem with selective filtering 500

Two pairs of transmission and reception channels are coupled to common antennas through transmit-receive switches, and to the second transceiver 505 in a manner similar to the illustration of FIG. 3. Two additional receiver front ends with selective filtering are used to provide extra link margin, and are also coupled to the second transceiver 505 and individual antennas. The implementations of the transmitter front ends and receiver front ends of the backhaul wireless modem with selective filtering 500 may be implemented as described above in FIGS. 4A and 4B. In one embodiment, the second transceiver 505 includes at least one baseband processor, at least one upconverter, and at least one downconverter. In another embodiment, the second transceiver 505 includes at least one baseband processor, two upconverters, and four downconverters. The second transceiver 505 is also coupled to the small cell with selective filtering 104.

A third transmitter front end with selective filtering 502a has an input coupled to an output of the second transceiver 505, and an output coupled to a terminal of a third transmit-receive switch 512a. A third receiver front end with selective filtering 504a has an input coupled to another terminal of the third transmit-receive switch 512a, and an output coupled to an input of the second transceiver 505. The output of the third transmit-receive switch 512a is coupled to a third antenna 516a. A third TR switch control line 530a couples the second transceiver 505 to the third TR switch 512a to ensure proper time division duplexing operation.

A fourth transmitter front end with selective filtering 502b has an input coupled to an output of the second transceiver 505, and an output coupled to a terminal of a fourth transmit-receive switch 512b. A fourth receiver front end with selective filtering 504b has an input coupled to another terminal of the fourth transmit-receive switch 512b, and an output coupled to an input of the second transceiver 505. The output of the fourth transmit-receive switch 512b is coupled to a fourth antenna 516b. A fourth TR switch control line 530b couples the second transceiver to the third TR switch 512a to ensure proper time division duplexing operation.

A fifth receiver front end with selective filtering 504c has an input coupled to a fifth antenna 516c, and an output coupled to an input of the second transceiver 505. A sixth receiver front end with selective filtering 504d has an input coupled to a sixth antenna 516d, and an output coupled to an input of the second transceiver 505.

A third transmit signal 520a flows in the third transmitter front end 502a from the second transceiver 505 towards the third antenna 516a. A fourth transmit signal 520b flows respectively in the fourth transmitter front end 502b from the second transceiver 505 towards the fourth antenna 516b. A third receive signal 522a flows in the third receiver front end 504a to the second transceiver 505 away from the third antenna 516a. A fourth receive signal 522b flows respectively in the fourth receiver front end 504b to the second transceiver 505 away from the fourth antenna 516b. A fifth receive signal 522c flows in the fifth receiver front end 504c to the second transceiver 505 away from the fifth antenna 516c. A sixth receive signal 522d flows in the sixth receiver front end 504d to the second transceiver 505 away from the sixth antenna 516d.

Figure 6:
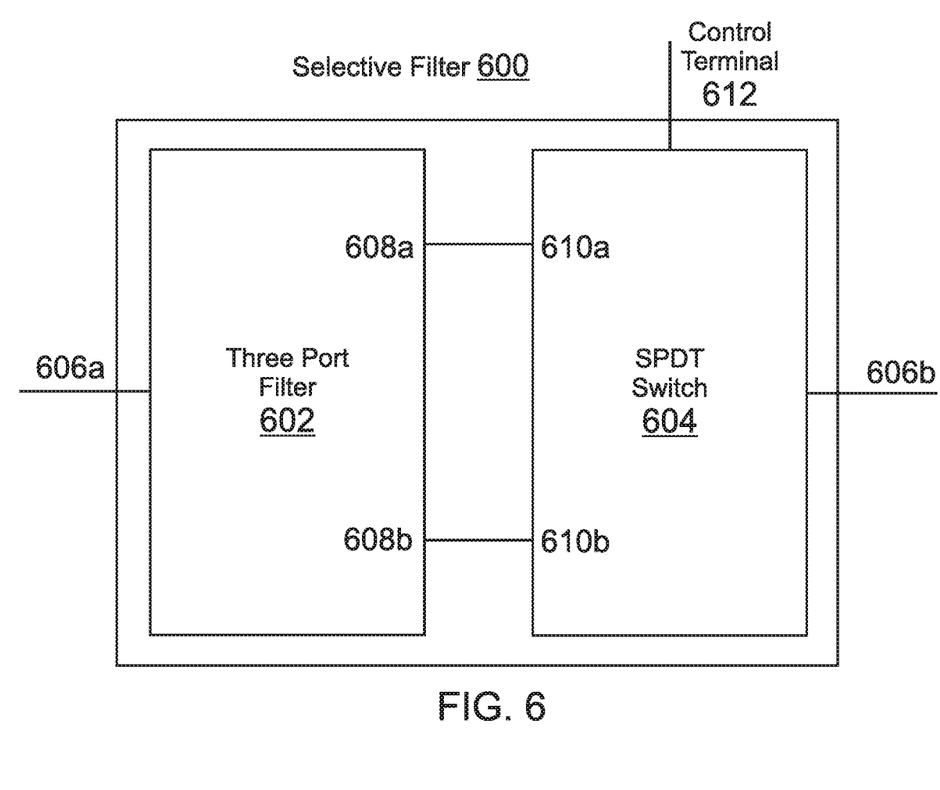
FIG. 6 illustrates an embodiment of a selective filter.

Returning to FIG. 4, each selective filter can be implemented with one filter, e.g. a band pass filter having a center frequency and corner frequencies, corresponding to the sub-band being used by the corresponding transceiver system in which the selective filtering is used. FIG. 6, however, illustrates another embodiment of a selective filter 600 which utilizes low cost, commercial off the shelf technology. The selective filter 600 includes a single pole double throw (SPDT) switch 604 coupled to a three-port filter 602. The SPDT switch 604 has two terminals 610a, 610b respectively coupled to two ports 608a, 608b, of the three-port filter 602, corresponding to different sub-bands. The SPDT switch 604 also has a common terminal 606b. The three-port filter 602 has a common port 606a. The common terminal 606b of the SPDT switch 604, and the common port 606a of the three-port filter 602, are the input/output terminals of the selective filter. In one embodiment, because the selective filter 600 is a reciprocal network the common terminal 606b and common port 606a can be used respectively as the input and output of the selective filter 600, or vice versa.

In one embodiment, the isolation between an unconnected terminal (i.e. not selected terminal) and the common terminal of the SPDT switch 604 in the adjacent sub-band is equal to or greater than the corresponding attenuation across the adjacent sub-band of the selective filter. This prevents the undesired out-of-band signals from leaking through the unselected terminal of the SPDT switch 604. Also, the insertion loss and power compression of the SPDT switch 604 should be sufficiently low and high to achieve the design of parameters the transceiver in which the SPDT switch 604 is used.

In one embodiment, the three-port filter 602 is a duplexer, such as a commercial off the shelf duplexer for 3G UMTS band 7. In another embodiment, the three-port filter 602 is a diplexer.

Figure 7:
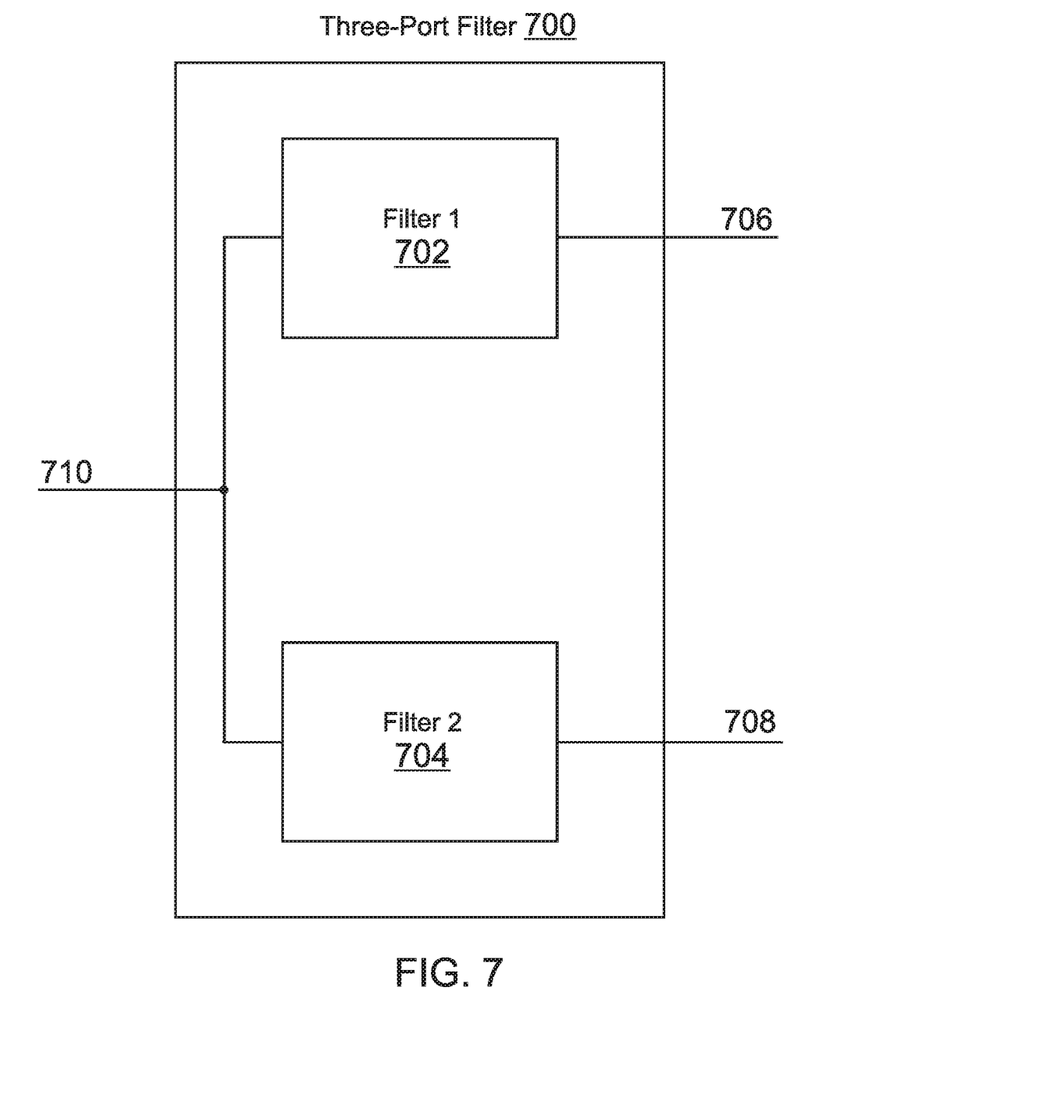
FIG. 7 illustrates one embodiment of a three-port filter.

FIG. 7 illustrates one embodiment of a three-port filter 700. The three-port filter 700 comprises filter 1 702 and filter 2 704 having a common port 710, and unique ports 706, 708 for each filter. In one embodiment, both filter 1 702 and filter 2 704 are bandpass filters, e.g. each having a center frequency and corner frequencies corresponding approximately to each sub-band. In another embodiment, the filter corresponding to the higher frequency sub-band can be implemented with a high pass filter. In a further embodiment, the filter corresponding to the lower frequency sub-band can be implemented with a low pass filter.

Returning to FIG. 6, the SPDT switch 604 has a control terminal 612 which can be biased, e.g. by a voltage, to select which terminal 610a, 610b is coupled to the common terminal. This can be used select whether the selective filter 600 uses the filter corresponding to the upper or lower sub-band. Thus, one selective filter 600 can be manufactured for use in both the small cell with selective filtering 104 and the backhaul wireless modem with selective filtering 106. When implemented in the small cell with selective filtering 104 and the backhaul wireless modem with selective filtering 106, the control terminals 612 of each selective filter 600 is biased to select the one filter in one sub-band for the small cell with selective filtering 104 and the other filter in the second sub-band for the backhaul wireless modem with selective filtering 106. For example, if the small cell with selective filtering 104 operates in the higher frequency sub-band, then the control terminal 612 for the selective filters 600 in the small cell with selective filtering 104 are biased so that they use the filter having a center and corner frequencies about that sub-band.

Figure 8:
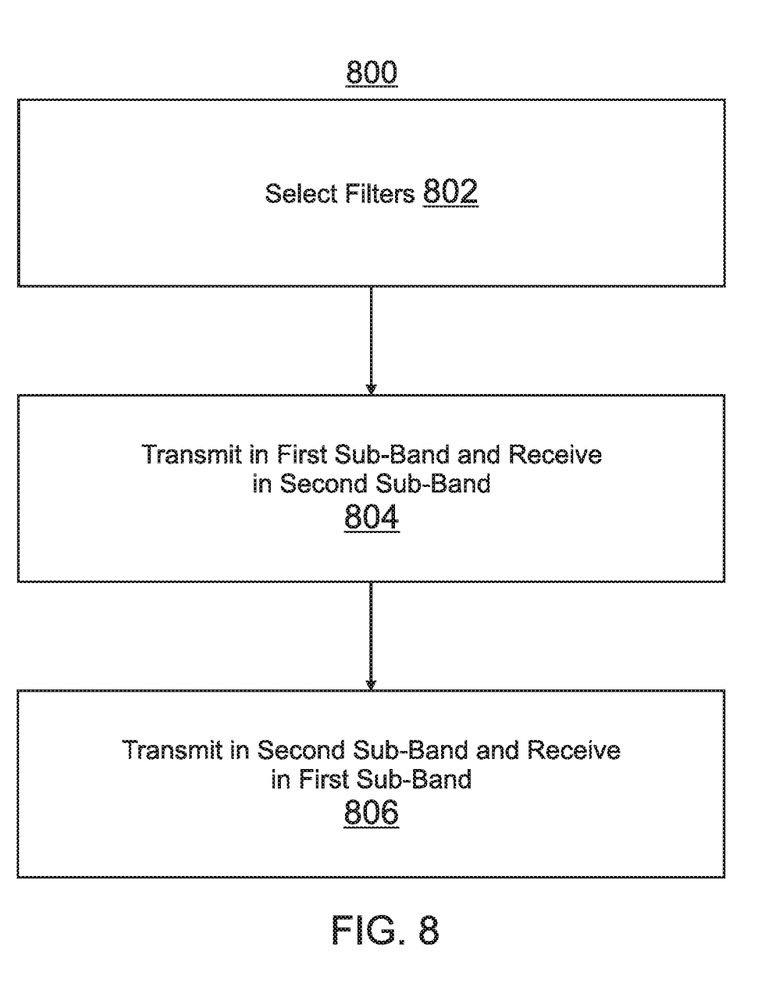
FIG. 8 illustrates one embodiment of operation of the exemplary communications network with selective filtering.

FIG. 8 illustrates one embodiment of operation of the exemplary communications network with selective filtering 100. In block 802, in one embodiment, select filters, e.g. by biasing the control terminals 612 of the selective filters 600 used in the small cell with selective filtering 104 and the backhaul wireless modem with selective filtering 106. In block 804, transmit in a first sub-band of a frequency band in which time division duplexing is required, while receiving in a second sub-band of the frequency band. In one embodiment, transmit a first signal in the first sub-band from the small cell with selective filtering 104, e.g. to user equipment 102; receive a second signal in the second sub-band at the backhaul wireless modem with selective filtering 106, e.g. from the macro cell 108. In block 806, transmit in the second sub-band, while receiving in the first sub-band. In one embodiment, receive a third signal in the first sub-band at the small cell with selective filtering 104, e.g. from user equipment 102; transmit a fourth signal in the second sub-band from the backhaul wireless modem with selective filtering 106, e.g. to the macro cell 108.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims. For example, a signal may be a voltage signal or a current signal.

The invention claimed is:

1. A communications system operating in a frequency band, comprising:
   a small cell with selective filtering, where the small cell with selective filtering comprises a first receiver front end and a first transmitter front end, where the first transmitter front end comprise a first selective filter, where the first receiver front end comprises a second selective filter, where each of the first selective filter and the second selective filter comprises a first filter coupled to a first switch, where the first filter comprises two passbands, where one of the two passbands is in a first sub-band, and where the first switch in each of the first selective filter and the second selective filter is set to select the first sub-band;
   a backhaul wireless modem with selective filtering coupled to the small cell, where the backhaul wireless modem with selective filtering comprises a second receiver front end and a second transmitter front end, where the second transmitter front end comprises a third selective filter, where the second receiver front end comprises a fourth selective filter, where each of the third selective filter and the fourth selective filter comprises a second filter coupled to a second switch, where the second filter comprises two passbands, where one of the two passbands is in a second sub-band, and where the second switch in each of the third selective filter and the fourth selective filter is set to select the second sub-band;

wherein the small cell with selective filtering is configured to only transmit and only receive in the first sub-band of the frequency band when the backhaul wireless modem with selective filtering is respectively receiving and transmitting in the second sub-band of the frequency band;

wherein the backhaul wireless modem with selective filtering is configured to only transmit and only receive in the second sub-band when the small cell is respectively receiving and transmitting the first sub-band; and wherein the first sub-band and the second sub-band are adjacent.

2. The communications system of claim 1, wherein the small cell with selective filtering and the backhaul wireless modem with selective filtering are coupled by an Ethernet connection.

3. The communications system of claim 1, wherein the small cell with selective filtering and the backhaul wireless modem with selective filtering are co-packaged.

4. The communications system of claim 1, wherein the small cell with selective filtering and the backhaul wireless modem with selective filtering each have at least two reception channels and at least two transmission channels.

5. The communications system of claim 1, wherein the small cell with selective filtering further comprises:
a first transceiver;
the first transmitter front end with selective filtering coupled to the first transceiver;
the first receiver front end with selective filtering coupled to the first transceiver;
a first transmit-receive switch coupled to the first transmitter front end with selective filtering and the first receiver front end with selective filtering;
at least one antenna coupled to the first transmit-receive switch; and
wherein the first transmit-receive switch is configured to connect an antenna to either the first receiver front end with selective filtering or the first transmitter front end with selective filtering depending upon whether the small cell with selective filtering is receiving or transmitting.

6. The communications system of claim 5, wherein the first transmitter front end with selective filtering further comprise:
a power amplifier coupled to the first transceiver;
a low pass filter coupled to the power amplifier; and
wherein the first selective filter is coupled to the low pass filter and the first transmit-receive switch.

7. The communications system of claim 6, wherein the transmitter front end with selective filtering further comprises a buffer amplifier coupled to the first transceiver and the power amplifier.

8. The communications system of claim 6, wherein each of the at least one transmitter front end with selective filtering further comprises a second selective filter coupled to the first transceiver and the power amplifier.

9. The communications system of claim 6, wherein the first selective filter comprises:
a first three-port filter having three ports and two filters;
a first single pole double pole (SPDT) switch having two terminals, a common terminal, and a control terminal;
wherein two ports of the first three-port filter are coupled to the two terminals of the first SPDT switch; and
wherein the first SPDT switch is configured to select one of the two filters of the first three-port filter based upon a signal applied to the control terminal of the first SPDT switch.

10. The communications system of claim 1, wherein the first filter is a duplexer.

11. The communications system of claim 5, wherein the receiver front end with selective filtering further comprises a low noise amplifier coupled to the second selective filter and the first transceiver.

12. The communications system of claim 11, wherein at least one receiver front end with selective filtering further comprises a fourth selective filter coupled to the low noise amplifier and the first transceiver.

13. The communications system of claim 11, wherein the third selective filter comprises:
a second three-port filter having three ports and two filters;
a second single pole double pole (SPDT) switch having two terminals, a common terminal, and a control terminal;
wherein two ports of the second three-port filter are coupled to the two terminals of the second SPDT switch; and
wherein the second SPDT switch is configured to select one of the two filters of the second three-port filter based upon a signal applied to the control terminal of the second SPDT switch.

14. The communications system of claim 1, wherein the second filter is a duplexer.

15. A method for operating a small cell and a backhaul wireless modem, comprising:
transmitting from the small cell on a first sub-band, where the small cell comprises a first receiver front end and a first transmitter front end, where the first transmitter front end comprise a first selective filter, where the first receiver front end comprises a second selective filter, where each of the first selective filter and the second selective filter comprises a first filter coupled to a first switch, where the first filter comprises two passbands, where one of the two passbands is in a first sub-band, and where the first switch in each of the first selective filter and the second selective filter is set to select the first sub-band;

only when the small cell is transmitting, receiving on the backhaul wireless modem, coupled to the small cell, on a second sub-band in the one frequency band and adjacent to the first sub-band, where the backhaul wireless modem comprises a second receiver front end and a second transmitter front end, where the second transmitter front end comprises a third selective filter, where the second receiver front end comprises a fourth selective filter, where each of the third selective filter and the fourth selective filter comprises a second filter coupled to a second switch, where the second filter comprises two passbands, where one of the two passbands is in a second sub-band, and where the second switch in each of the third selective filter and the fourth selective filter is set to select the second sub-band;
receiving on the small cell on the first sub-band;
only when the small cell is receiving, transmitting from the backhaul wireless modem on the second sub-band;
wherein the small cell is configured to only transmit and receive in the first sub-band of the frequency band when the backhaul wireless modem is respectively receiving and transmitting in the second sub-band of the frequency band; and
wherein the backhaul wireless modem is configured to only transmit and receive in the second sub-band when the small cell is respectively receiving and transmitting the first sub-band.

16. The method of claim 15, further comprising selecting at least one filter.

17. The method of claim 16, wherein selecting at least one filter comprises selecting a one filter in a duplexer.

18. The method of claim 16, wherein selecting at least one filter comprises selecting positions of at least one switch.

19. A communications system operating in a frequency band, comprising:
a small cell with selective filtering comprising:
a first transceiver;
at least one first transmitter front end with selective filtering coupled to the first transceiver;
wherein each of the at least one first transmitter front end with selective filtering comprises:
a first power amplifier coupled the first transceiver;
a first low pass filter coupled to the first power amplifier; and
a first selective filter coupled to the first low pass filter;
wherein the first selective filter comprises:
a first duplexer having three ports;
a first single pole double pole (SPDT) switch having two terminals, a common terminal, and a control terminal;
wherein two ports of the first duplexer are coupled to two terminals of the first SPDT switch; and
wherein the first SPDT switch is configured to select one of the two filters of the first duplexer based upon a signal applied to the control terminal of the first SPDT switch;
at least one first receiver front end with selective filtering coupled to the first transceiver;
wherein each receiver front end with selective filtering comprises:
a second selective filter; and
a first low noise amplifier coupled to the second selective filter;
wherein the second selective filter comprises:
a second duplexer having three ports and two filters;
a second single pole double pole (SPDT) switch having two terminals, a common terminal, and a control terminal;
wherein two ports of the second duplexer are coupled to two terminals of the second SPDT switch; and
wherein the second SPDT switch is configured to select one of the two filters of the second duplexer based upon a signal applied to the control terminal of the second SPDT switch;
a backhaul wireless modem with selective filtering, coupled to and proximate to the small cell, comprising:
a second transceiver;
at least one second transmitter front end with selective filtering coupled to the second transceiver;
wherein each of the at least one second transmitter front end with selective filtering comprises:
a second power amplifier coupled the second transceiver;
a second low pass filter coupled to the power amplifier; and
a third selective filter coupled to the second low pass filter;
wherein the third selective filter comprises:
a third duplexer having three ports and two filters;
a third single pole double pole (SPDT) switch having two terminals, a common terminal, and a control terminal;
wherein two ports of the third duplexer are coupled to two terminals of the third SPDT switch; and
wherein the third SPDT switch is configured to select one of the two filters of the third duplexer based upon a signal applied to the control terminal of the third SPDT switch;
at least one first receiver front end with selective filtering coupled to the first transceiver;
wherein each of the at least one receiver front end with selective filtering comprises:
a fourth selective filter; and
a second low noise amplifier coupled to the fourth selective filter;
wherein the fourth selective filter comprises
a fourth duplexer having three ports and two filters;
a fourth single pole double pole (SPDT) switch having two terminals, a common terminal, and a control terminal;
wherein two ports of the fourth duplexer are coupled to two terminals of the fourth SPDT switch; and
wherein the fourth SPDT switch is configured to select one of the two filters of the fourth duplexer based upon a signal applied to the control terminal of the fourth SPDT switch; and
wherein the small cell with selective filtering is configured to transmit and receive in a first sub-band of the frequency band when the backhaul wireless modem with selective filtering is respectively receiving and transmitting a second sub-band of the frequency band;
wherein the backhaul wireless modem with selective filtering is configured to transmit and receive in the second sub-band when the small cell with selective filtering is respectively receiving and transmitting the first sub-band; and
wherein the first sub-band and the second sub-band are adjacent.

20. The communications system of claim 19, further comprising a macro cell configured to communicate with the backhaul wireless modem in the second sub-band.

21. The communication system of claim 1, wherein said first sub-band of said frequency band comprises a first plurality of channels, and wherein said second sub-band of said frequency band comprises a second plurality of channels.

22. The communication system of claim 21, wherein the small cell with selective filtering is configured to selectively filter said frequency band in order to pass said first sub-band; and wherein the backhaul wireless modem with selective filtering is configured to selectively filter said frequency band in order to pass said second sub-band.

23. The method of claim 15, wherein said first sub-band of said frequency band comprises a first plurality of channels, and wherein said second sub-band of said frequency band comprises a second plurality of channels.

24. The method of claim 23, further comprising:
- selectively filtering, by the small cell, said frequency band in order to pass said first sub-band; and
- selectively filtering, by the backhaul wireless modem, said frequency band in order to pass said second sub-band.

\* \* \* \* \*